United States Patent
Atherton (10) Patent No.: US 9,671,793 B2
(45) Date of Patent: Jun. 6, 2017

(54) MULTI-PHASE METERING OF FLUID FLOWS

(71) Applicant: Senico Limited, Witney, Oxford (GB)

(72) Inventor: Eric Atherton, Witney (GB)

(73) Assignee: Senico Limited, Witney, Oxford (GB)

( * ) Notice: Subject to any disclaimer, the term of this patent is extended or adjusted under 35 U.S.C. 154(b) by 134 days.

(21) Appl. No.: 14/296,575

(22) Filed: Jun. 5, 2014

(65) Prior Publication Data

US 2014/0299210 A1 Oct. 9, 2014

Related U.S. Application Data (63) Continuation of application No. PCT/EP2012/074694, filed on Dec. 6, 2012.

(30) Foreign Application Priority Data

Dec. 6, 2011 (GB) .................................. 1120972.3

(51) Int. Cl.
*G05D 7/06* (2006.01)
*G01F 1/74* (2006.01)

(52) U.S. Cl.
CPC ............ *G05D 7/0635* (2013.01); *G01F 1/74* (2013.01); *G05D 7/06* (2013.01); *Y10T 137/86485* (2015.04)

(58) Field of Classification Search
CPC ...... G05D 7/06; G01F 1/74; Y10T 137/86485
USPC .......................... 137/624.27; 73/195, 861.04
See application file for complete search history.

(56) References Cited

U.S. PATENT DOCUMENTS

| | | | | |
|---|---|---|---|---|
| 4,050,896 A | | 9/1977 | Raffel | 436/183 |
| 4,168,624 A | * | 9/1979 | Pichon | G01F 1/74 73/19.01 |
| 4,891,969 A | * | 1/1990 | Wayland | G01N 33/2823 73/61.44 |
| 5,099,697 A | * | 3/1992 | Agar | G01F 1/74 73/195 |

(Continued)

FOREIGN PATENT DOCUMENTS

| | | | | |
|---|---|---|---|---|
| DE | 102006008661 | | 11/2007 | G01F 1/74 |
| EP | 0484876 | | 5/1992 | G01F 1/74 |

(Continued)

OTHER PUBLICATIONS

GB Search Report, GB1119104.6; dated Apr. 16, 2012. 5 pages.

(Continued)

*Primary Examiner* — Michael R Reid
*Assistant Examiner* — Christopher Ballman
(74) *Attorney, Agent, or Firm* — Sunstein Kann Murphy & Timbers LLP (57) ABSTRACT

A multi-phase flow meter includes a flow conduit leading from an inlet to an outlet and including a variable inlet restriction, a variable outlet restriction, a pressure sensor and a volumetric flow meter, located between the variable inlet restriction and the variable outlet restriction. The flow meter further includes a controller adapted to receive data from the pressure sensor and the volumetric flow meter, and to adjust the variable inlet restriction and the variable outlet restriction in accordance with at least one program. The program causes the controller to adjust one of the variable inlet restriction and the variable outlet restriction.

16 Claims, 3 Drawing Sheets

(56) References Cited

U.S. PATENT DOCUMENTS

| | | | | |
|---|---|---|---|---|
| 5,461,930 A | * | 10/1995 | Farchi | G01F 1/74 73/195 |
| 5,654,502 A | * | 8/1997 | Dutton | G01N 33/2823 73/152.18 |
| 5,962,780 A | * | 10/1999 | Prouvost | G01N 33/2823 73/198 |
| 6,134,951 A | * | 10/2000 | Scott | G01F 15/08 73/61.44 |
| 6,318,156 B1 | * | 11/2001 | Dutton | E21B 43/36 73/61.44 |
| 7,647,136 B2 | * | 1/2010 | McDowell | F17D 3/01 137/12 |
| 2006/0037385 A1 | * | 2/2006 | Gysling | G01F 1/74 73/61.44 |
| 2007/0193373 A1 | * | 8/2007 | Xie | B01F 5/0682 73/863.03 |
| 2009/0101213 A1 | | 4/2009 | Kielb | 137/12 |
| 2009/0293634 A1 | | 12/2009 | Ong | 73/861.04 |
| 2010/0199779 A1 | * | 8/2010 | Liu | G01F 1/363 73/861.04 |
| 2010/0305880 A1 | * | 12/2010 | Oddie | G01F 1/74 702/47 |

FOREIGN PATENT DOCUMENTS

| | | | | |
|---|---|---|---|---|
| EP | 1686355 | | 8/2006 | G01F 1/36 |
| GB | 2026704 | | 2/1980 | G01P 5/14 |

OTHER PUBLICATIONS

International Searching Authority—EPO, International Search Report and Written Opinion, PCT/EP2012/074694; dated Apr. 17, 2013. 12 pages.

* cited by examiner

MULTI-PHASE METERING OF FLUID FLOWS

This application is a continuation of Patent Cooperation Treaty Application PCT/EP2012/074694, filed Dec. 6, 2012, which in turn claims priority from Great Britain Patent Application 1120972.3, filed Dec. 6, 2011, both of which are incorporated herein by reference in their entireties.

TECHNICAL FIELD

The present invention relates to three-phase metering of fluid flows, for example at wellheads, where it is necessary to measure the individual flow rates of oil, water and gas fractions within the fluid flow out of an oil well.

BACKGROUND ART

Knowledge of the individual flow rates of the gas fraction, the oil fraction, and the water fraction within the flow of fluid from an oil well is an important part of the efficient management of the well and the associated subsurface reservoir. Such wells typically tap into reservoirs such as that shown in FIG. 1, in which a simplified well is shown penetrating a reservoir. The reservoir consists of a permeable rock formation typically filled with a lower layer of water 110, an intermediate layer of oil 112, and an upper layer of gas 114 trapped under a layer of cap rock 116. The result of this is that the balance between the fractions of each that are extracted is affected by the positioning of the well perforations 120 at the lower end of the production string 122 relative to the layers, and the flow rate of the fluid out of the well. The flow rate is relevant in that over production of a well can reduce the total amount of oil recovered due to a number of reasons, including drawing the underlying water layer 124 up towards the perforations 120 and creating a cone of water above the undisturbed oil/water contact in the region of the well. The appropriate response to this is to reduce the overall flow rate in order to optimize the oil extraction rate. Typically this is achieved with a choke valve 134 located in or close to the wellhead 132. The choke value may be variable, but more commonly it consists of a fixed orifice of a precise flow section that under normal operating conditions, produces "critical flow", a supersonic flow that is only dependent on the wellhead pressure upstream of the choke, independent of the pressure downstream of the choke. Selecting a specific size of choke enables the reservoir engineer to select an optimum flowrate for the well. Within a reasonably wide range, the well flowrate is then not affected by varying back pressure in the flowline 130 to the surface facility 126.

The surface facility separates the oil, water and gas streams and measures the flowrate of each phase, disposes of the water (and sometimes gas), and passes the other fluids to market. The surface facility typically receives the flow from many wells, and has a test separator and a production separator. Most of the wells are comingled and flow into the production separator, where only the aggregate flowrates are available, From time to time, the flow from each well is sent to the test separator, and then the phase flowrates for oil, gas and water for that well are measured. It will be clear that for most of the time, the well flows are not measured; instead flows are inferred from general measurements by a process known in the industry as "allocation". Allocation is important as the reservoir and well production can only be optimized if the flow from each well is known. Also, in certain countries, royalty rates for each state are calculated on the basis of well production within the state boundaries, so a general production figure for an entire oil field that crosses state boundaries is not detailed enough, and individual well production figures are needed.

Individual separators for each well would be very costly, and so there is a need for a multiphase flowmeter (MPFM) that is cost effective for individual wells. A further advantage of installing MPFMs on each well is that rather than having individual flowlines running back to the surface facility, it is possible to comingle the flows of wells into a single larger flowline back to the facility. This approach has considerable cost advantages, particularly for subsea wells.

Attention has therefore been directed to in-line flowmeters able to distinguish between the three fractions. An example can be seen in U.S. Pat. No. 5,461,930 which discusses the measurement of two- and three-phase fluid flow. Volumetric and momentum (mass) flow meters are provided, which yield corresponding data from which (and from knowledge of the respective densities), the relative flow rates of the different phases can be determined.

Another example can be seen in US2004/0182172A1, which uses Venturis and chokes in the flowline to create pressure differentials along the flowline. The gas fraction is very much more compressible than the oil and water fractions, and therefore from assessing the pressure differentials produced by several different chokes and/or Venturis, it is possible (in principle) to determine the gas fraction. The relative water & oil fractions can then be determined by electrical properties of the fluid, particularly its capacitive properties in a manner that is acknowledged by US2004/0182172A1 as being known in the oil & gas industries.

This arrangement is proposed as an in-line meter 128 (FIG. 1) for use in the flowline 130 at some intermediate point between the production well and a remote processing location. However, as discussed in U.S. Pat. No. 5,461,930 in relation to still earlier designs, it suffers from the inherent difficulty that in order to create significant pressure differentials, there must be a significant flow restriction (by way of either a choke or a venturi). Thus, the flow of the fluid out of the well and to the remote processing location may be adversely affected. If the meter is designed so that there is little effect on flow, then the pressure differentials are correspondingly reduced and the accuracy of the meter is affected. Typically, such a device will have to measure pressure differentials of 1 or 2 bar in a base pressure of about 100 bar. To determine the proportions of the different fractions, three pressure differentials need to be compared, meaning that in order to obtain accurate information as to the fractional ratios, the pressure differentials will need to be accurate to millibar levels. This is a significant challenge.

SUMMARY

Embodiments of the present invention are directed to provide a multi-phase flow meter that can operate accurately without having an adverse effect on the fluid flow out of the well (or other context in which it is installed) and along the flowline.

Embodiments therefore provide a multi-phase flow meter, including a flow conduit leading from an inlet to an outlet and comprising a variable inlet restriction, a variable outlet restriction, a pressure sensor and a volumetric flow meter, located between the variable inlet restriction and the variable outlet restriction, the flow meter further comprising a controller adapted to receive data from the pressure sensor and the volumetric flow meter, and to adjust the variable inlet restriction and the variable outlet restriction in accordance with at least one program, wherein the at least one program causes the controller to adjust one of the variable inlet restriction and the variable outlet restriction such that the fluid pressure between them adopts a first pressure, then further adjust the restriction such that the fluid pressure between the restrictions adopts a second and different pressure, and to record the first pressure, the second pressure, and the volumetric fluid flow rates at the first pressure and at the second pressure, whilst adjusting the other of the variable inlet restriction and the variable outlet restriction so that the total flow restriction imposed by the two restrictions is maintained at a substantially constant level.

The variable inlet and outlet restrictions can be continuously variable between a minimum restriction and a maximum restriction, ideally monotonically so. Ideally, when at the maximum restriction, all flow is prevented. This allows maximum flexibility of the device. Alternatively, variable inlet or outlet restriction could be variable between a plurality of discrete values, which may provide the necessary degree of freedom at lower cost or complexity. Such an arrangement could be, for example, an on-off valve in parallel with a bypass path containing a flow restriction. The volumetric flow meter can be an ultrasonic flow meter or a turbine flow meter, for example.

We prefer that the controller has a further program, in addition to the program mentioned above, which causes the controller to close fully the inlet or the outlet flow restriction and to open fully the outlet or the inlet flow restriction, respectively, to maintain this state for a period of time, and to adjust the calibration of at least one of the pressure sensor and the volumetric flow meter during this period.

Thus, a multi-phase flow meter according to the invention can be summarized as being one that includes a flow conduit in which is located a variable inlet restriction, a variable outlet restriction, and a control arrangement adapted to vary the restrictions in concert so as to control the pressures in surrounding flowlines while varying the pressure in the flow conduit between the restrictions, further comprising a pressure sensor and a flow meter located between the variable inlet restriction and the variable outlet restriction for measuring the varying pressure and the resulting flow rates.

The above allows the calculation of the relative proportions of gas and liquid phases in the fluid that is flowing through the device, as will be explained below. Thus, the multiphase flow meter of the invention preferably further comprises a computing means to calculate the relative fractions of gas and liquid flowing through the flow conduit, based on the measured pressures and flow rates.

The multi-phase flow meter can also comprise a mass flow meter located between the inlet and the outlet flow restrictions. With knowledge of the proportion of liquid in the fluid flow, and of the relative densities of the liquids that are flowing, this then allows the computing means to calculate the relative fractions of different liquids, based on the measured volumetric and mass flow rates.

DETAILED DESCRIPTION

Figure 1:
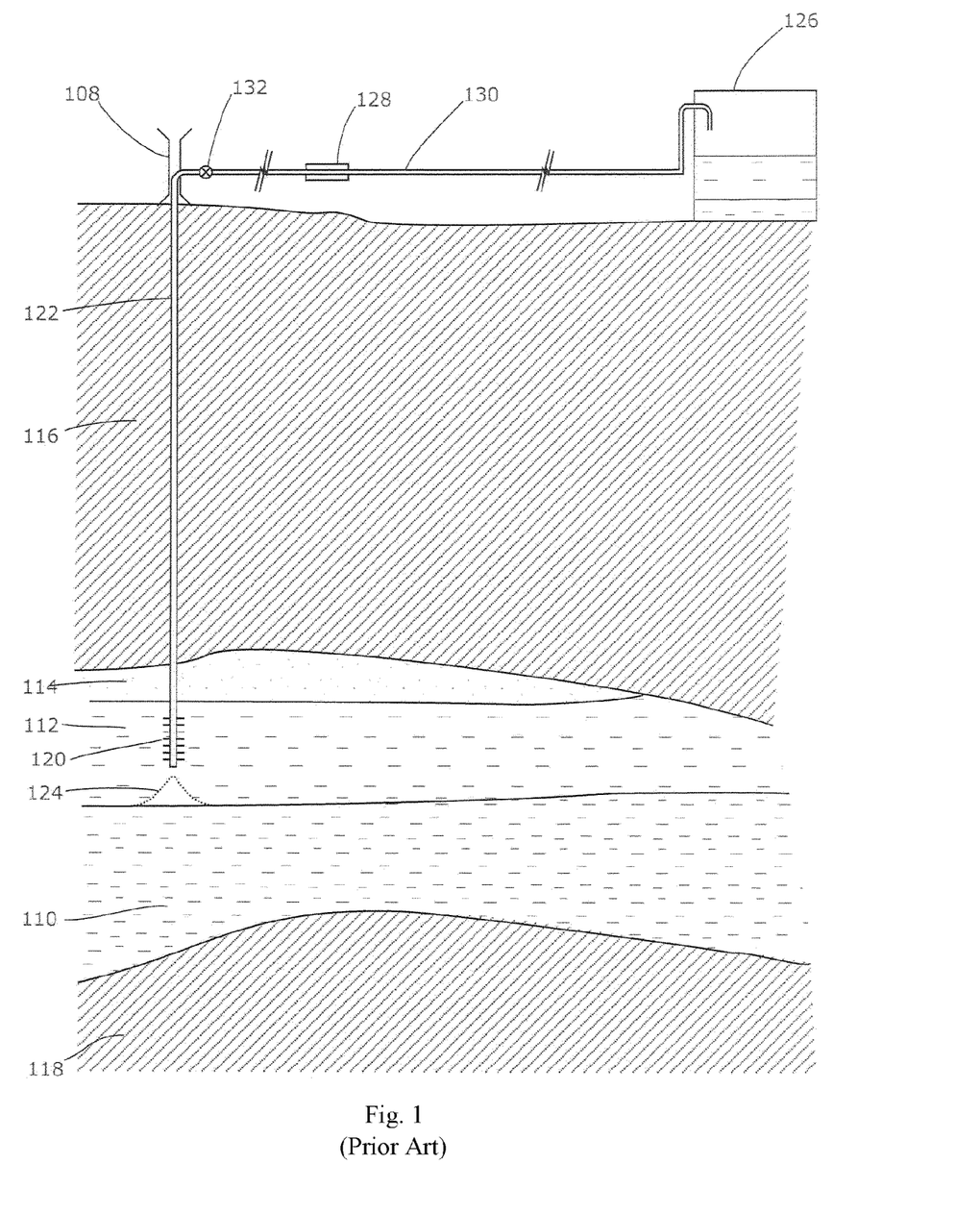
FIG. 1 shows the general layout of a known oilfield extraction system.

The present invention achieves its desired aim by integrating the functions of the flow meter 128 and the choke 132. In a "live" well (i.e. one not requiring pumping in order to lift the oil to the surface) the oil/water/gas mixture will leave the well at a pressure dictated by the properties of the reservoir that the well is tapping into, the reduction of pressure due to the hydraulic pressure head of the fluids in the well, and frictional losses, and may be in the region of 1,000 psi. This needs to be reduced for the flowline to about 300 psi or less, which is usually achieved by way of a choke 132 (FIG. 1). This is simply a flow restriction that serves to reduce the pressure of the fluid released from the well 108 to the flowline 130 to a level that is sufficient to ensure adequate flow and yet low enough to avoid damage.

Figure 2:
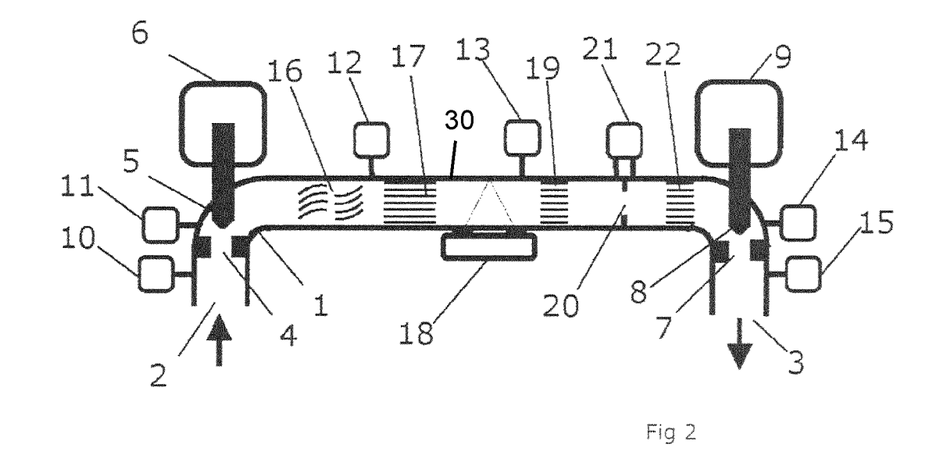
FIG. 2 shows a vertical sectional view through a multiphase flowmeter according to the present invention.

FIG. 2 shows a multiphase flowmeter (MPFM) 1 according to the present invention. It includes a fluid inlet 2, and fluid outlet 3 connected by a suitably pressure-rated conduit 30. The fluid flow within the MPFM 1 from the inlet 2 to the outlet 3 is controlled by an inlet valve and an outlet valve. The inlet valve consists of an inlet actuator 6 that controls an inlet valve stem 5, and an inlet valve seat 4 towards and away from which the inlet actuator 6 can move the inlet valve stem 5 so as to impose a variable flow restriction, The outlet valve likewise consists of outlet actuator 9, outlet valve stem 8 and outlet valve seat 7, acting in a like fashion. The inlet valve and the outlet valve are both continuously and precisely variable from closed to fully open, controlled by the PFM controller (not shown). The valves are monotonic, so that at all points of their movement, a small opening movement of the valve stem will cause a small decrease in flow resistance. All sensor information (to be described below) is also sent to the MPFM controller.

Combined pressure/temperature sensors, 10, 11, 12, 13, 14 and 15 monitor the pressure and temperature of the fluid in the various parts of the flowmeter from the inlet 2 to the outlet 3. Generally, there is a combined pressure/temperature sensor after each flow-affecting element within the MPFM 1 so that the fluid flow can be monitored throughout the device. This enables remote diagnostics of developing problems, such as scaling, wax or sand contamination within the various sections.

Fluid entering via the fluid inlet 2 thus passes through inlet valve seat 4 and its pressure may be reduced to a greater or lesser extent depending on the position of the inlet valve. This is followed by fluid mixer 16, intended to mix the fractions within the fluid flow in order to create a homogenous mixture. Such fluid often separates when allowed to flow freely, into gaseous fractions at the top (etc.) and the fluid mixer 16 comprises a series of baffles and vanes aimed at preventing this. This is followed by a series of sequential flow straighteners 17, 19, 22 which aim to establish or restore axial flow in the fluid. The fluid then exits the MPFM 1 through outlet valve seat 7 to the fluid outlet 3, with its pressure again being reduced to a greater or lesser extent depending on the position of the outlet valve.

The pressure and temperature change across the inlet valve can be obtained by the difference between sensors 10 and 11, the pressure and temperature change across the fluid mixer 16 can be obtained by the difference between sensors 11 and 12 and the pressure and temperature change across the outlet valve can be obtained from by the difference between sensors 14 and 15.

The pressure and temperature change across the inlet valve, along with the precise position of the inlet valve may be used to monitor and quantify the stability of flow into the device over time. This can be achieved if the MPFM controller has knowledge of the relationship between the inlet valve position and the flow resistance of the valve at that position. This information, along with the pressure drop across the inlet valve, enables an approximate gross flowrate to be calculated. This gross flowrate can be used to check the other flowrates calculated at various points in the meter and at various stages during the measurement process. Significant errors or discrepancies might indicate an error or fault condition, while small discrepancies can be used to provide correction factors.

The region of the flowmeter 1 between the straighteners 17 and 19 has a homogenous axial flow. The fluid velocity in this region is determined by an ultrasonic flowmeter 18. This will typically be a Doppler meter of known construction, although time-of-flight or correlation instruments may also be used. The pressure/temperature sensor 13 measures the pressure and temperature of the fluid in this region, which is at the heart of the measurement system. Between straighteners 19 and 22, the fluid passes through an orifice plate 20, across which the differential pressure is measured by differential pressure sensor 21.

In the preferred embodiment, where the flowmeter is used for accurately measuring 3-phase flow (oil, water, gas) from a production well 108, the well 108 providing the source of the fluid will typically be fitted with standard safety equipment such as a subsurface shut-in valve and surface shut in valves. The well production fluid is then routed to the inlet 2 of the MPFM 1, will flow through the MPFM 1, and out of the outlet 3, which is connected to a surface flowline 130 leading to a remote processing facility 126. It will be noted that pressure/temperature sensor 10 will now read the wellhead pressure, and pressure/temperature sensor 15 will now read the flowline pressure at the wellhead end of the flowline 130.

It should be noted that MPFM 1 performs the function of the traditional fixed "choke valve" 132 in regulating the well production flowrate, as well as measuring the 3-phase flow, so the choke may be removed, or alternatively set to a size that limits the well to the highest safe rate. In routine use the MPFM controller is commanded to maintain a certain flow resistance equivalent to a certain size of traditional choke valve as required for the optimum production of the well. It should be noted that the MPFM controller may achieve this by setting the inlet valve fully open, and the outlet valve to the required flow resistance. Alternatively, the MPFM controller could achieve the same overall effect by setting the outlet valve fully open, and setting the inlet valve to the required flow resistance. Furthermore, the MPFM controller can smoothly change the valves from the first combination to the second combination by gradually closing the inlet valve and opening the outlet valve in such a way that the flow resistance of the valve combination remains unchanged during the transition. During this time, the pressure in the MPFM between the inlet valve and the outlet valve will smoothly change from the inlet pressure (wellhead pressure) to the outlet pressure (flowline pressure). As the total flow resistance of the MPFM is constant during this transition, the well flow will be substantially constant, the wellhead pressure will remain constant and the flowline pressure will remain constant. Only the pressure inside the MPFM will change.

In this way, the MPFM 1 of FIG. 2 (comprising two variable choke valves) is able to establish a flow restriction equivalent to a traditional choke valve 132, while establishing any desired fluid pressure in the flow path between the two variable choke valves. So far as the flowline 130 is concerned, the situation is identical to a single choke valve 132 as shown in FIG. 1. However, the MPFM controller is able to manipulate the pressure within the MPFM 1 to any desired level falling between the wellhead pressure and the flowline pressure.

Figure 3:
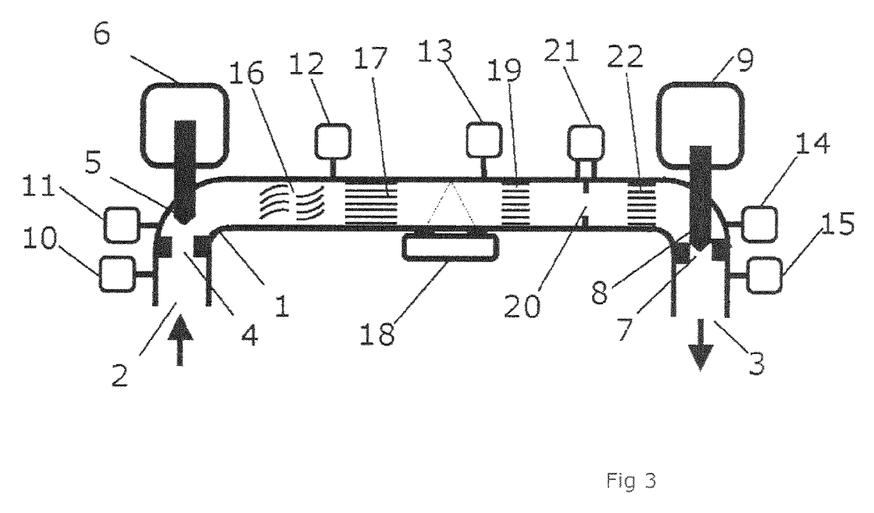
FIG. 3 shows the multiphase flowmeter of FIG. 2 with the downstream valve closed.
Figure 4:
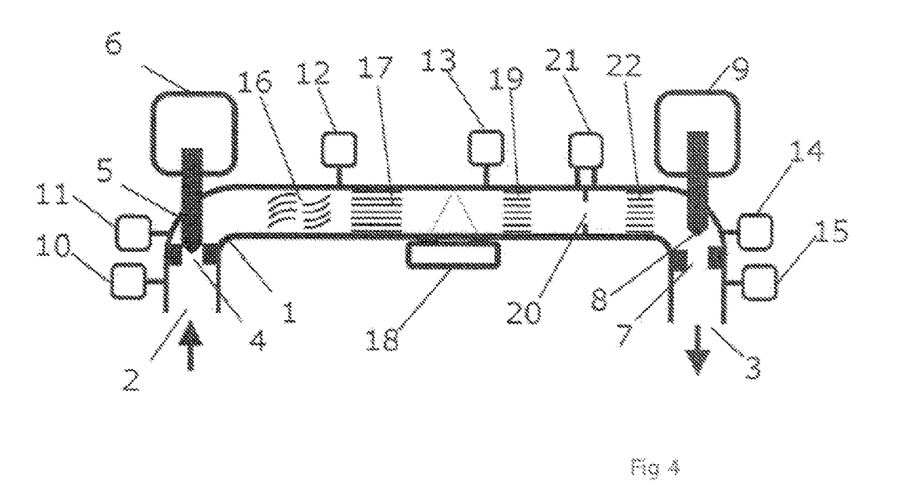
FIG. 4 shows the multiphase flowmeter of FIG. 2 with the upstream valve closed.

The MPFM 1 may also be used to shut the well in. FIG. 3 shows the outlet valve closed, and the inlet valve fully open. In this configuration, pressure/temperature sensors 10, 11, 12, 13, 14 will all be reading the same pressure as there is no flow through the MPFM. This pressure will be wellhead pressure. FIG. 4 also shows a fully shut-in well, but this time the inlet valve is closed and the outlet valve is fully open. In this case, pressure/temperature sensors 11, 12, 13, 14, 15 will all read the same pressure, which will be the flowline pressure (with no flow in the flowline). It is important to note that in these cases, the pressure sensors can be auto zeroed/auto calibrated, a process where differential offset errors are eliminated by comparing readings when all sensors are known to be exposed to the same pressure. In this case, the ability to set a low pressure (the flowline pressure) and a high pressure (the wellhead pressure) enables both zero and gain auto alignment to be performed, thus adjusting the calibration as necessary. In practice, this allows differential pressures to be adequately measured with a pair of absolute pressure sensors rather than an additional differential sensor in most parts of the MPFM.

Referring again to FIG. 2, under normal operation, when the MPFM is controlling at the optimum well flowrate, the inlet valve and the outlet valve are preferably set at a similar flow resistance. This central setting provides half the total pressure drop across each valve, and hence equalizes and minimizes erosion of the valves. To perform a measurement cycle, the MPFM controller gradually opens the outlet valve and closes the inlet valve in a smooth transition to a setting which establishes a lower pressure in the MPFM 1, which is then held. A set of measurements are then taken (see below). The MPFM controller then gradually returns the inlet and outlet valve to the central setting which is then held, and another set of measurements are taken. In this way, a set of measurements are taken at two pressures. The flow through the MPFM all the time remains constant, because the MPFM controller is maintaining a constant flow resistance for the overall MPFM during the measurement cycle. It is possible to confirm that the flowrate has not changed during a measurement cycle by monitoring the pressure drop across the inlet valve with respect to the inlet valve position as described above. A complete set of measurements thus consists of:

Pressure P from pressure/temperature sensor 13
Temperature T from pressure/temperatures sensor 13,
Fluid velocity V from ultrasonic flowmeter 18
Differential pressure DP from differential pressure sensor 21

There are thus two sets of measurements from the same sensors, designated

Central measurement set; PI, T1, VI, DP1
Lower measurement set: P2, T2, V2, DP1

The calculations to be carried out are therefore as follows, based on the following parameters:

| Measured Parameter | At PI | At P2 | Units |
| --- | --- | --- | --- |
| Fluid velocity | Fv1 | Fv2 | m/s |
| Pressure | P1 | P2 | psia |

-continued

| Measured Parameter | At P1 | At P2 | Units |
|---|---|---|---|
| Temperature | T1 | T2 | C. |
| Differential Pressure | DP1 | DP2 | psid |

In addition, certain parameters need to be calculated in a straightforward manner, i.e.;

Volumetric flow rate at $P1$, $Q1=Fv1 \cdot ax$ ($ax$ being the conduit cross-sectional area)

Volumetric flow rate at $P2$, $Q2=Fv2 \cdot ax$

For the purposes of describing the system, we define P2 as being the lower of the two pressures, P1 and P2. Assuming that the mass flowrate is constant, the volumetric flow rate at P2 will therefore be greater than at P1.

The increase in the volumetric flowrate is therefore $Qd=Q2-Q1$.

For the purpose of illustration and clarity, it is assumed in these calculations that liquids are incompressible, that the gas fraction behaves as a perfect gas, and the reduction in volume of crude oil when gas is released is negligible. Those skilled in the art will be aware of how such second order corrections may be applied in order to reflect the actual fluid properties.

For a perfect gas, $$p1 \cdot v1/t1 = p2 \cdot v2/t2 \qquad (1$$

$$v1 = k \cdot v2, \text{ where } k = p2 \cdot t1/(p1 \cdot t2)$$

$$v1 = kE/(1-k), \text{ where expansion factor, } E = v2-v1 \qquad (1$$

Considering one second of flow (so we can equate volumes and flowrates), we can write:

Volumetric flowrate of gas fraction at $P1$,
$Qg1 = k \cdot Qd/(1-k)$

Hence the liquid volumetric flowrate at P1, $QL1=Q1-Qg1$

The densities of the gas, oil and water fractions at different temperatures and pressures are measured when a reservoir is first produced, and then updated from time to time. This process, known as PVT analysis, is well known. From PVT analysis, the density of the oil and water fractions, Do, Dw are stored in the MPFM controller, and the exact gas density at P1 and P2, Dg1 and Dg2 is calculated, using the perfect gas equation from the gas density at standard pressure and temperature.

The gas mass flow rate $Mg1=Dg1 \cdot Qg1$

The volumetric liquid fraction, $FL1=QL1/Q1$

The volumetric gas fraction, $Fg1=1-FL1$

The total fluid density can be obtained from the differential pressure across the orifice plate.

$$D1 = 2 \cdot C^2 \cdot A^2 \cdot DP1/Q1^2$$

where A is the cross section area of the orifice hole, $$C = \frac{C_d}{\sqrt{1-\beta^4}},$$

$\beta = d_2/d_1$,
$d_2$ = diameter of the orifice hole,
$d_1$ = diameter of the conduit, and
$C_d$ is the discharge coefficient, typically of the order of 0.6

The density of the liquid fraction DL1 can now be calculated from the equation:

$$D1 = Dg1 \cdot Fg1 + DL1 \cdot FL1$$

where D1, Dg1, Fg1 and FL1 are now known.

Finally, the oil fraction, Fo1, can be calculated from the equation:

$$FL1 \cdot DL1 = Do \cdot Fo1 + Dw(FL1 - Fo1)$$

where FL1, DL1, Do, Dw are known.

And the water fraction is given by $Fw1 = FL1 - Fo1$.

Now that fractions and the volumetric flow rates for all three phases have been computed, the mass flow rates for each phase can be computed as the phase densities are known. Hence a total mass flow rate can be computed.

The entire procedure above can then be repeated, reducing all the results to the P2 environment.

Comparing results between the P1 environment and the P2 environment, clearly the fractions and volumetric flowrates will differ, due to the different pressures. However, the mass flowrates should be the same. In particular, the total mass flowrate computed should be the same for the two sets of computations.

The sensitivity of the computation to instrumentation errors from the absolute sensors (P and T) are largely eliminated in the above computation, due to the invention allowing the same pressure and temperature sensor to be used in both P1 and P2 measurement sets.

The calculations are still sensitive to errors in the fluid velocity, Fv1 and Fv2, and the differential pressure, DP1 and DP2. These errors can largely be eliminated via a normalization method. In this method, a correction velocity is speculatively added to Fv1 (for example), and the two calculation sets are computed, and the two total mass flowrates calculated are compared. The process is then repeated, using the Newton-Raphson method adjusting the correction velocity until the two computed mass flowrates are the identical. This process dramatically increases the accuracy of the calculated volumetric fractions and velocities. Other parameter could be corrected in a similar manner, and other correction methods will be apparent to those skilled in the art.

Figure 5:
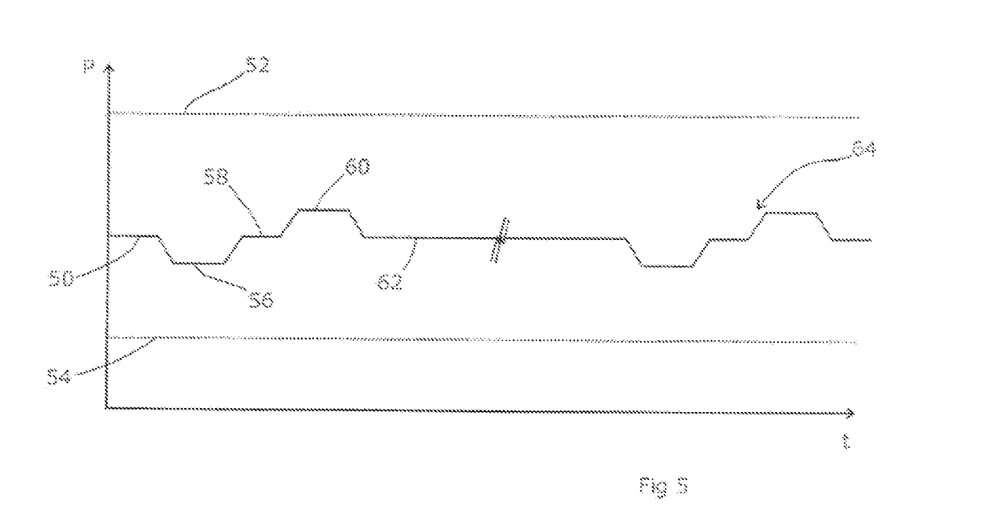
FIG. 5 shows a pressure/time curve for the pressure inside the multiphase flowmeter of FIG. 1.

FIG. 5 shows a possible pressure/time profile for the apparatus. The pressure shown is of course the pressure within the measurement region, i.e. between the inlet and outlet valves as will be sensed by the sensors 11, 12, 13, 14. The pressure prior to the inlet valve and the pressure subsequent to the outlet valve are of course dictated by the combined flow resistance imposed by the two valves collectively, and are controlled to remain within the desired limits by adjustment of that collective flow resistance. The balance between the flow resistance imposed by the inlet valve and that imposed by the outlet valve can be varied, and this allows the pressure in the fluid between them to be adjusted as desired between the upper and lower pressures either side of the device.

Thus, the default state is one in which the pressure 50 within the device is approximately midway between the higher pressure 52 at which the fluid arrives from the well, and the lower pressure 54 in the flowline 130 after the multiphase flowmeter. As mentioned, this places both the inlet and the outlet valves at an approximate midway position in which wear is minimized.

When a measurement is to be taken, the pressure, temperature, and flow rate readings can be taken. Then, the inlet valve can closed slightly and the outlet valve opened slightly, causing the pressure within the device to drop to the reduced level 56. A second set of pressure, temperature and flow measurements can be taken. The inlet and outlet valves can then be returned to their previous positions and the default state 58 will be resumed.

If desired, the pressure can then be set at a higher value 60 in a corresponding manner, to provide a third set of pressure, temperature and flow values. These can be used to check the results calculated from the first set and provide a confidence level for the results. Once this is done, the pressure can then be returned to the default value 62 where it will remain until the next measurement cycle 64. Further confirmatory measurements could be taken at the same pressures or at different pressures, as desired.

Of course, the pressure could be raised instead of being increased as shown and as described above. Where multiple pressure readings are taken, these could be taken in any desired order.

In a context where there is plenty of excess pressure, the well could be designed with a conventional choke valve to drop the pressure, followed by the MPFM operating between a reduced upper pressure and the desired flowline pressure. Such as arrangement still has the advantages of significantly lower instrumentation cost, and also benefits from the other advantages set out above. Alternatively, the valves could be replaced with on/off valves, each in combination with a fixed choke valve in parallel with the respective on/off valve. In such an arrangement, there would always be flow through the meter, which would operate over a narrow pressure range. It could comprise a simplified (and therefore reduced cost) valve set due to the lower pressures. The on/off valves can be simple ball valves, which could be connected together on a single shaft driven by one actuator. If the ball valves are placed 90 degrees out of phase, so either one or the other is on, while the other is off, then this will enable quite rapid toggling between the two pressures, allowing the system to react quickly if the flowrate is trending quickly. Indeed, such a device could toggle pressures as frequently as every second.

The invention can also be used with a Coriolis-type meter, arranged between the inlet valve and the outlet valve, A coriolis meter measures both massflow and density. In the manner described above, the invention derives both P1 (and T1) and P2 (and T2), and the density at pressures P1 and P2 gives the gas fraction, from which it is possible to extract the fluid density, and hence the oil/water fractions (assuming that the individual oil and water densities are known. This leaves one redundant reading, i.e. the mass flow at P1 and at P2. As we know these are the same, they can be used to normalize the results.

Other momentum flowmeter devices can be used in substitution for the orifice plate, such as a venturi or cone. The system is flexible as to its design and could be re-engineered to a physical arrangement suited to use on the surface, or in a subsea context, or in a downhole location.

The above-described system could of course be deployed in an alternative context (i.e. other than that of hydrocarbon extraction) where it was desired to measure the relative fractions in a multi-phase fluid flowing through a conduit. The high-speed variant mentioned above could be particularly appropriate for such use.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A multi-phase flow meter for measuring individual flow rates of oil, water and gas fractions within a fluid flow from an oil well, the meter comprising:
   a flow conduit having a single inlet end and a single outlet end and configured to carry a flow of a multi-phase fluid between the said inlet and outlet ends,
   a single variable inlet restriction at the inlet end of the flow conduit configured to control the flow of the multi-phase fluid through the inlet end into the flow conduit, and
   a single variable outlet restriction at the outlet end of the flow conduit configured to control the flow of the multi-phase fluid from the outlet end of the flow conduit,
   a pressure sensor and a flow meter, located in the flow conduit between the variable inlet restriction and the variable outlet restriction, and
   a controller adapted to receive data from the pressure sensor and the flow meter, and to adjust the variable inlet restriction and the variable outlet restriction in accordance with at least one program;
   wherein in accordance with the at least one program the controller is arranged to adjust one of the variable inlet restriction and the variable outlet restriction such that the fluid pressure between them adopts a first pressure, then to further adjust the restriction such that the fluid pressure between the restrictions adopts a second and different pressure, and to record the first pressure, the second pressure, and the fluid flow rates at the first pressure and at the second pressure;

whilst adjusting the other of the variable inlet restriction and the variable outlet restriction so that the total flow restriction imposed by the inlet and outlet restrictions is maintained at a substantially constant level, so that the multi-phase flow rate is maintained constant from the well and through the meter.

2. The multi-phase flow meter according to claim 1, wherein the variable inlet restriction is continuously variable between a minimum restriction and a maximum restriction.

3. The multi-phase flow meter according to claim 2, wherein the variable inlet restriction is a monotonic valve that is variable between the minimum restriction and the maximum restriction such that it is capable either of opening but not of closing, or of closing but not opening.

4. The multi-phase flow meter according to claim 2, wherein the inlet restriction prevents all flow when at the maximum restriction.

5. The multi-phase flow meter according to claim 1, wherein the variable inlet restriction is variable between a plurality of predetermined discrete and repeatable values.

6. The multi-phase flow meter according to claim 1, wherein the variable outlet restriction is continuously variable between a minimum restriction and a maximum restriction.

7. The multi-phase flow meter according to claim 6, wherein the variable outlet restriction is a monotonic valve that is variable between the minimum restriction and the maximum restriction such that it is capable either of opening but not of closing, or of closing but not opening.

8. The multi-phase flow meter according to claim 6, wherein the outlet restriction prevents all flow when at the maximum restriction.

9. The multi-phase flow meter according to claim 1, wherein the variable outlet restriction is variable between a plurality of predetermined discrete and repeatable values.

10. The multi-phase flow meter according to claim 1, wherein the flow meter is a volumetric flow meter.

11. The multi-phase flow meter according to claim 10, wherein the flow meter is an ultrasonic flow meter.

12. The multi-phase flow meter according to claim 10, wherein the flow meter is a turbine flow meter.

13. The multi-phase flow meter according to claim 1, wherein the controller has a further program that causes the controller to fully close the inlet restriction or the outlet restriction and to open fully the outlet restriction or the inlet restriction, respectively, to maintain this state for a period of time, and to calibrate at least one of the pressure sensor and the flow meter at that time.

14. The multi-phase flow meter according to claim 1, further comprising:

a computing means to calculate the relative fractions of gas and liquid flowing through the flow conduit based on the measured pressures and flow rates.

15. The multi-phase flow meter according to claim 14, further comprising:

a mass flow meter located between the inlet and the outlet flow restrictions.

16. The multi-phase flow meter according to claim 15, wherein the computing means is further arranged to calculate the relative fractions of different liquids based on the measured and mass flow rates.

* * * * *